United States Patent [19]

Yamamoto et al.

[11] Patent Number: 5,032,008
[45] Date of Patent: * Jul. 16, 1991

[54] LIQUID CRYSTAL DISPLAY DEVICE HAVING OPTICAL DELAY PLATES

[75] Inventors: Tomiaki Yamamoto, Chigasaki; Akio Murayama, Kamakura; Susumu Kondo, Yokosuka; Hitoshi Hato, Yokohama; Shinichi Kamagami, Yokohama; Shoichi Matsumoto, Yokohama, all of Japan

[73] Assignee: Kabushiki Kaisha Toshiba, Kawasaki, Japan

[*] Notice: The portion of the term of this patent subsequent to Feb. 26, 2008 has been disclaimed.

[21] Appl. No.: 376,659

[22] Filed: Jul. 7, 1989

[30] Foreign Application Priority Data

Jul. 8, 1988 [JP] Japan ................................. 63-169016

[51] Int. Cl.⁵ .................................................. G02F 1/13
[52] U.S. Cl. ................................. 350/339 R; 350/337; 350/347 R
[58] Field of Search ................... 350/334, 337, 339 R, 350/347 R

[56] References Cited

U.S. PATENT DOCUMENTS

| 4,844,569 | 7/1989 | Wada et al. | 350/347 R |
| 4,852,976 | 8/1989 | Suzuki | 350/339 R |
| 4,909,606 | 3/1990 | Wada et al. | 350/347 R |

FOREIGN PATENT DOCUMENTS

| 0246842 | 11/1987 | European Pat. Off. | 350/335 |
| 2028527 | 5/1980 | United Kingdom | 350/347 R |
| 2171549A | 8/1986 | United Kingdom | 350/347 R |

Primary Examiner—Stanley D. Miller
Assistant Examiner—Huy K. Mai
Attorney, Agent, or Firm—Cushman, Darby & Cushman

[57] ABSTRACT

This invention discloses a liquid crystal display device including a liquid crystal cell having two substrates, arranged substantially parallel to each other, and having electrodes on their opposing surfaces, and a liquid crystal composition held between the substrates, first and second polarizers arranged at both sides of the liquid crystal cell, a first optical delay plate arranged between the liquid crystal cell and the second polarizer, and a second optical delay plate arranged between the first optical delay plate and the second polarizer, wherein liquid crystal molecules of the liquid crystal composition are arranged in twisted mode from a second polarizer side to a first polarizer side, the first and second optical delay plates are arranged such that optical axes thereof cross to form an acute angle, and a twist direction of the liquid crystal molecules in the state of twisted mode is the same as a direction from the optical axis of the second optical delay plate toward the first optical delay plate shifted by the acute angle. A display performed by the liquid crystal display device of this invention is a high-contrast, bright, and achromatic b/w display. The liquid crystal display device of this invention has a wide viewing angle. The liquid crystal display device of this invention is inexpensive.

3 Claims, 3 Drawing Sheets

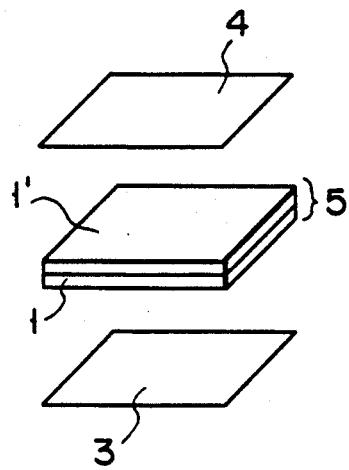
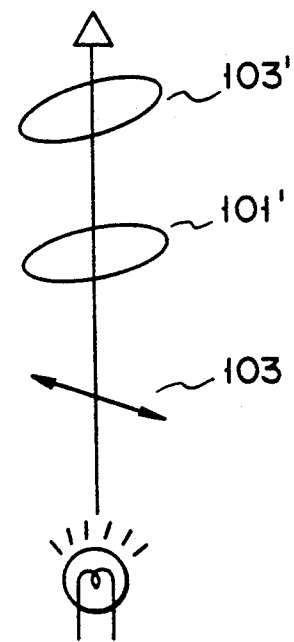
F I G. 1A     F I G. 1B
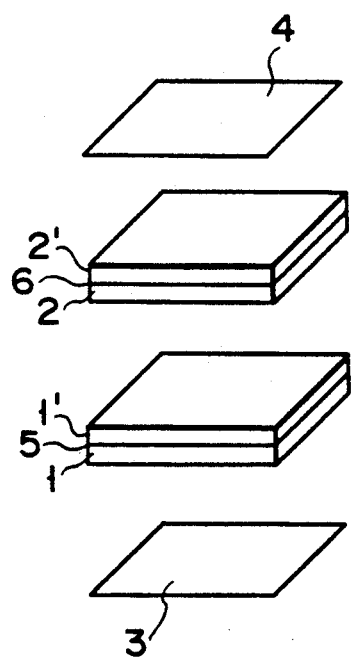
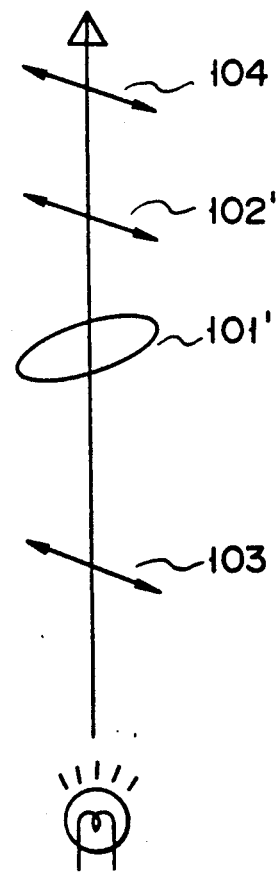
F I G. 2A     F I G. 2B

LIQUID CRYSTAL DISPLAY DEVICE HAVING OPTICAL DELAY PLATES

RELATED APPLICATIONS

This application is related to application No. 07/376,541 and 07/376,653, both filed July 7, 1989 and to application No. 07/385,535 filed July 26, 1989.

BACKGROUND OF THE INVENTION

1. Field of the Invention

The present invention relates to a liquid crystal display device suitable for an achromatic black and white (b/w) display.

2. Description of the Related Art

Conventional liquid crystal display devices can be classified into, e.g., a TN type, a DS (dynamic scattering) type, a GH type, a DAP (deformation of aligned phases) type, and a thermal write type in accordance with their operation modes. Of these devices, the TN liquid crystal display device has been often used as a display device for a portable calculator, a measuring instrument, and the like.

In recent years, a higher information content and a larger display area have been required for a display device for use in a wordprocessor, a personal computer, and the like. However, the conventional TN liquid crystal display device has problems of, e.g., an insufficient contrast and a narrow viewing angle. In this case, the viewing angle is taken to mean an angle at which a display can be clearly seen. For this reason, the TN liquid crystal display device cannot satisfy the above requirements. Therefore, a demand has arisen for a liquid crystal device having a new operation mode satisfying the above requirements.

As a liquid crystal display device capable of satisfying these requirements, Japanese Patent Disclosure (Kokai) No. 60-10702 discloses an electrically controlled birefringence, supertwisted birefringence effect (SBE) liquid crystal display device. This SBE liquid crystal display device comprises a cell obtained by sealing two transparent substrates arranged to oppose each other by a distance of 3 to 12 μm. Transparent electrodes are formed on at least opposing surfaces of the two transparent substrates, respectively. A nematic liquid crystal is filled in the cell. Examples of the nematic liquid crystal for use in the SBE liquid crystal cell are cyclohexane-, ester-, biphenyl-, and pyrimidine-based liquid crystals. A chiral agent is added to the nematic liquid crystal so that the molecular axes of the liquid crystal molecules are rotated through an angle of 180° to 360° between the pair of substrates. In addition, since an alignment film is formed on the surface in contact with a liquid crystal of the substrate, the molecular axis of the liquid crystal has a tilt angle ($\theta$) larger than 5° with respect to the substrate surface. Retardation R of this liquid crystal cell is given by:

$$R = \Delta n \cdot d \cdot \cos^2\theta$$

The value of the retardation R is 0.6 to 1.4 μm. In the above equation, $\Delta n$ represents the optical anisotropy of a liquid crystal composition in the liquid crystal cell, d is the cell thickness (substrate spacing), and $\theta$ is the tilt angle.

Of the SBE liquid crystal display devices, a device in which the molecule axes of the liquid crystal are rotated through 270° is well known. In this device, polarizers are preferably arranged in front and rear of a liquid crystal cell. Most preferably, a transmission axis of the front polarizer arranged in front of the liquid crystal cell has an angle of about 30° clockwise with respect to an alignment direction of liquid crystal molecules on the front substrate of the liquid crystal cell, and a transmission axis of the rear polarizer arranged in rear of the liquid crystal cell has an angle of about 30° counterclockwise or about 60° clockwise with respect to an alignment direction of liquid crystal molecules on the rear substrate. When the angle between the transmission axis of the rear polarizer and the molecular axis of the liquid crystal molecule on the rear substrate is about 30° counterclockwise, bright yellow is displayed in a nonselect state, and black is displayed in a select state (yellow mode). When the angle is about 60° clockwise, deep blue is displayed in the nonselect state, and white is displayed in the select state (blue mode).

In the SBE liquid crystal display device, light transmission largely changes in accordance with even a small change in voltage applied to the device. Therefore, according to the SBE liquid crystal display device, even in case of a display with a large line number operated by a multiplexing drive, a high contrast and a wide viewing angle can be obtained.

SID' 86 DIGET, P. 122 describes a supertwisted (ST) liquid crystal display device in which a tilt angle is decreased and a twist angle of liquid crystal molecule is 100° to 200°. A term "twist angle" means an angle between a molecular axis of a liquid crystal molecule on one substrate and that on the other substrate.

Japanese Patent Disclosure (Kokai) No. 60-73525 discloses a liquid crystal display device using a liquid crystal cell in which retardation R is 0.5 to 0.8 μm and a twist angle of liquid crystal molecule is 270°. In this liquid crystal display device, two polarizers are arranged to sandwich the liquid crystal cell. According to this patent disclosure, it is preferred that an angle defined between optical axes of the two polarizers is substantially 90°.

A basic arrangement of the SBE or ST liquid crystal display device is shown in FIG. 1A. As shown in FIG. 1A, the SBE or ST liquid crystal display device has a liquid crystal cell 5, and two polarizers 3 and 4 arranged to sandwich the liquid crystal cell 5. The cell 5 comprises opposing substrates 1 and 1', and a liquid crystal composition held between the substrates. A polarization state of light transmitting through the device shown in FIG. 1A is shown in FIG. 1B. Light emitted from a light source is transmitted through the polarizer 3 to become linearly polarized light 103. The light 10 is transmitted through the cell 5 to become elliptically polarized light 101'. The shape of this ellipse is determined by a twist angle $\Psi$ of a liquid crystal of the cell 5, retardation R, and a wavelength $\lambda$ of the light. A part of the light 101' transmitted through the cell 5 is transmitted through the polarizer 4 and sensed by a human eye.

As described above, the transmission of the light in the above liquid crystal display device depends on the shape of the ellipse of the elliptically polarized light produced upon transmission through the liquid crystal cell. And the shape of the ellipse of the elliptically polarized light depends on the wavelength of the light. Therefore, the transmitted light through the device generally becomes chromatic. For example, as described above, the SBE liquid crystal display device exhibits yellow (yellow mode) or blue (blue mode)

color in the nonselect state. This property is sometimes effective in special applications. However, the property is undesirable when these liquid crystal display devices are used as display units for a personal computer and office equipment. In addition, when the display surface is chromatic, its readability is evaluated to be inferior to that of a b/w display.

The TN liquid crystal display device can be used as a color display unit by arranging a color filter on a substrate. In the above liquid crystal display device, however, since the display surface becomes chromatic, its color reproducibility degrades.

In addition, the color of the above liquid crystal display device largely changes in accordance with a viewing angle or a temperature.

As a device which solves the above problems, Appl. Phys. Lett. 50(5), 1987, P. 236 describes an OMI liquid crystal display device. In this OMI liquid crystal display device, a twist angle of liquid crystal molecule is 180° and the value of retardation R is 0.5 to 0.6 μm. This device has two polarizers arranged such that a transmission axis of one of the polarizers is parallel to a rubbing axis of a substrate and an angle defined between absorbing axes of the two polarizers is 90°.

In the OMI liquid crystal display device, however, a change in transmission of the liquid crystal is not so large a compared with a change in voltage to be applied to the liquid crystal. Therefore, when a drive duty ratio is decreased, problems such as an insufficient contrast radio, a narrow viewing angle, and a dark background arise.

Double-cell ST (D-ST) liquid crystal display devices disclosed in Japanese Patent Disclosure (Kokai) Nos. 57-46227, 57-96315, and 57-125919 can solve the problems of the OMI liquid crystal display device, especially, the problems of a dark background and insufficient contrast. As shown in FIG. 2A, each ST liquid crystal display device comprises two adjacent liquid crystal cells 5 and 6, and two polarizers 3 and 4 arranged before and after the cells 5 and 6, respectively. The cells 5 and 6 have substantially the same retardation values and absolute value of twist angles of liquid crystal molecule in the cells. The cells 5 and 6 are arranged such that twist directions of liquid crystal molecule in the cells 5 and 6 are opposite to one another. A term "twist direction" means a direction along which the molecular axes of liquid crystal spirally arranged.

A polarization state of light through the liquid crystal display device having the above arrangement is shown in FIG. 2B. Light emitted from a light source is transmitted through the first polarizer to become linearly polarized light 103. The light 103 is then transmitted through the first liquid crystal cell 5 to become elliptically polarized light 101'. The light 101' is transmitted through the second liquid crystal cell 6 to become linearly polarized light 102'. This is because the cell 6 has substantially the same retardation and twist angle as those of the cell 5 and has the twist direction of liquid crystal molecule opposite to that of the cell 5. The light 102' transmitted through the cell 6 is transmitted through or absorbed by the second polarizer 4 in accordance with the direction of a vibration surface.

In this D-ST liquid crystal display device, it is important that the first and second liquid crystal cells 5 and 6 optically complement each other. For this purpose, in particular, the retardation values of the cells must be substantially equal to each other. A difference between the retardation values of the two liquid crystal cells is, e.g., ±0.05 μm.

In this D-ST liquid crystal display device, electrodes are formed on substrates 1 and 1' of the cell 5 and driven as in a normal dot-matrix liquid crystal display device. The cell 6 is, however, used to simply compensate the elliptically polarized light produced by the cell 5 and therefore need not be driven. Therefore, it is not necessary an electrode is formed on substrates 2 and 2'.

The D-ST liquid crystal display device can provide an achromatic b/w display. This means that all the incident light components can be effectively used. Therefore, since a light amount on the display surface is large, a bright screen can be obtained. In addition, the number of scanning lines can be increased in this D-ST liquid crystal display device.

This D-ST liquid crystal display device uses two liquid crystal cells requiring high manufacturing precision. Therefore, a manufacturing cost is increased to result in an expensive device.

Furthermore the viewing angle of this D-ST liquid crystal display device, however, is narrower than those of the SBE and OMI liquid crystal display devices.

SUMMARY OF THE INVENTION

It is therefore an object of the present invention to provide an achromatic b/w liquid crystal display device having a large contrast ratio and a wide viewing angle.

A liquid crystal display device according to the present invention comprises:

a liquid crystal cell including two substrates which are arranged substantially parallel to each other and have electrodes on opposing surfaces thereof and a liquid crystal composition held between the substrates;

first and second polarizers arranged at both sides of the liquid crystal cell;

a first optical delay plate arranged between the liquid crystal cell and the second polarizer; and a second optical delay plate arranged between the first optical delay plate and the second polarizer, wherein liquid crystal molecules in the liquid crystal composition are arranged in twisted mode from a second polarizer side to a first polarizer side, the first and second optical delay plates are arranged such that optical axes thereof cross to form an acute angle, and a twist direction of the liquid crystal molecules in the state of twisted mode is the same as a direction from the optical axis of the second optical delay plate toward the first optical delay plate shifted by the acute angle.

According to the liquid crystal display device of the present invention, an achromatic b/w display, which is bright and has a high contrast and a wide viewing angle, can be obtained. In addition, the liquid crystal display device of the present invention is inexpensive.

BRIEF DESCRIPTION OF THE DRAWINGS

FIG. 1A is an exploded perspective view schematically showing a basic arrangement of a conventional SBE or ST liquid crystal display device;

FIG. 1B is a schematic view showing a polarization state of light transmitting through the liquid crystal display device shown in FIG. 1A;

FIG. 2A is an exploded perspective view schematically showing an arrangement of a conventional D-ST liquid crystal display device;

FIG. 2B is a schematic view showing a polarization state of light transmitting through the liquid crystal display device shown in FIG. 2A;

DETAILED DESCRIPTION OF THE PREFERRED EMBODIMENTS

A liquid crystal display device of the present invention will be described below with reference to the accompanying drawings.

Figure 3B:
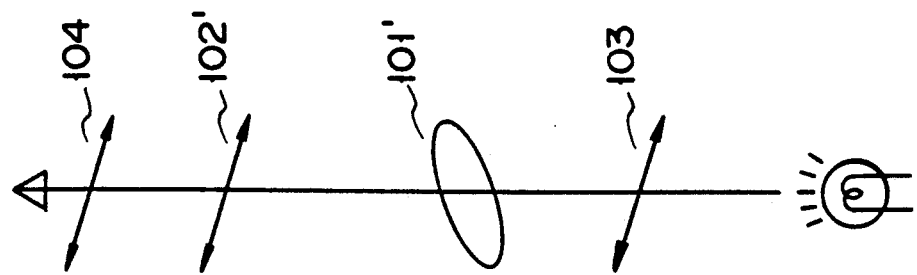
FIG. 3B is a schematic view showing a polarization state of light transmitting through the liquid crystal display device shown in FIG. 3A.
Figure 3A:
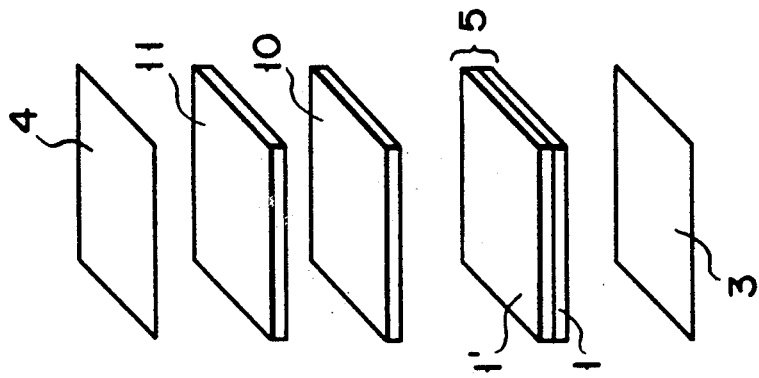
FIG. 3A is an exploded perspective view schematically showing an embodiment of a liquid crystal display device of the present invention.

FIG. 3A is an exploded perspective view schematically showing an arrangement of the liquid crystal display device of the present invention, and FIGS. 4A to 4E are views showing alignment directions of liquid crystal molecules on substrate surfaces of a liquid crystal cell of the liquid crystal display device shown in FIG. 3A, directions of absorbing axes of polarizers thereof, and directions of optical axes of optical delay plates thereof. Referring to FIGS. 4A to 4E, each rectangle S represents a plane parallel to the substrates of liquid crystal display device. In each of FIGS. 4A to 4E, an angle of an axis is defined on the basis of a reference line RL considering that the liquid crystal display device is one system. In this case, a counterclockwise direction from the reference line is represented by "+", and a clockwise direction therefrom is represented by "−".

Referring to FIG. 3A, a liquid crystal cell 5 has substantially parallel substrates 1 and 1'. Transparent electrodes are normally formed on the substrates 1 and 1'. A spacing between the two substrates is normally 6 to 7.5 μm. The substrates 1 and 1' are sealed and fixed by a sealing agent such as an epoxy resin. A liquid crystal composition is filled between the sealed substrates 1 and 1'.

A nematic liquid crystal is normally used as a liquid crystal to be filled in the cell 5. Preferable examples of the nematic liquid crystal are cyclohexane-, ester-, biphenyl-, and pyrimidine-based liquid crystals. In order to twist or rotate liquid crystal molecules spirally through an angle of 180° to 360° between the substrates 1 and 1', one or more chiral agents are added to the nematic liquid crystal. A conventional chiral agent can be used as the chiral agent to be added to the liquid crystal.

Figures 4A, 4B, 4C, 4D, 4E:
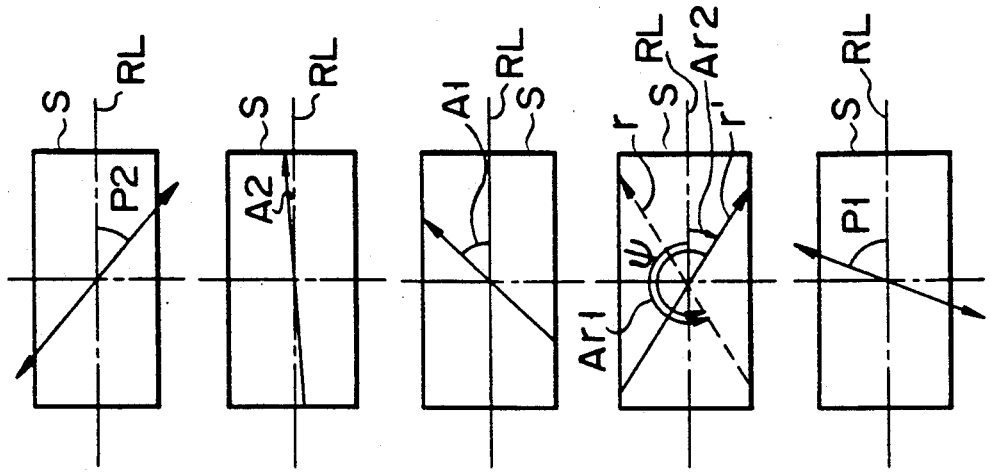
FIG. 4A is a view showing a direction of an absorbing axis of a second polarizer of the liquid crystal display device shown in FIG. 3A.
FIG. 4B is a view showing a direction of an optical axis of a second optical delay plate of the liquid crystal display device shown in FIG. 3A.
FIG. 4C is a view showing a direction of an optical axis of a first optical delay plate of the liquid crystal display device shown in FIG. 3A.
FIG. 4D is a view showing alignment directions of liquid crystal molecules on substrate surfaces of a liquid crystal cell of the liquid crystal display device shown in FIG. 3A.
FIG. 4E is a view showing a direction of an absorbing axis of a first polarizer of the liquid crystal display device shown in FIG. 3A.

By pretreating opposing surfaces of the substrates 1 and 1' by using a known technique such as rubbing, an alignment direction of a molecular axis of a liquid crystal molecule on the substrates can be defined. In this manner, a twist angle of the liquid crystal between the substrates 1 and 1' can be controlled. That is, as shown in FIG. 4D, a twist angle $\Psi$ of the liquid crystal is determined by an alignment direction r of the substrate 1 of the liquid crystal cell 5 and an alignment direction r' of the substrate 1' thereof.

The twist angle of the liquid crystal molecules is preferably large so that an alignment angle of the liquid crystal molecule drastically changes in accordance with even a small voltage change. A preferable twist angle is 180° to 270°.

First and second optical delay plates 10 and 11 are arranged in the order named at the opposite side of the substrate 1' of the cell 5 against to the substrate 1 thereof. As shown in FIGS. 4C and 4B, optical axes of the first and second plates 10 and 11 have angles of $A_1$ and $A_2$, respectively, with respect to the reference line. These optical delay plates cancel a phase shift of light produced upon its transmission through the cell 5. The rotation angle is defined as the acute angle between the optical axes of the optical delay plates 10 and 11. The optical delay plates 10 and 11 are arranged such that a direction of rotation from the optical axis of the second plate 11 to the optical axis of the first plate 10 becomes the same as a twist direction of the liquid crystal molecules in the state of twisted mode from the substrate 1' to the substrate 1. When this condition is satisfied, a high-contrast b/w display can be obtained. If the direction of rotation between the optical axes of the two optical delay plates is opposite to the twist direction of the liquid crystal molecules in the liquid crystal cell, the display is not a complete b/w display but a chromatic one. As an optical delay plate for use in the liquid crystal display device of the present invention, a stretched film of a stretched polyvinyl alcohol, for example, can be used. In this case, a stretching direction of the stretched film corresponds to an optical axis of an optical delay plate.

A second polarizer 4 is arranged opposite the side of the second plate 11 that is against the first plate 10. A first polarizer 3 is arranged opposite the side of the cell 5 that is against the first plate 10. Directions of absorbing axes of the polarizers 3 and 4 are shown in FIGS. 4E and 4A, respectively. The polarizers 3 and 4 are arranged such that their absorbing axes form angles of P1 and P2, respectively, with respect to the reference line.

A polarization state of light transmitting through the liquid crystal display device of the present invention is shown in FIG. 3B. Light incident on the liquid crystal display device is polarized by the polarizer 3 into linearly polarized light 103. The light 103 transmitted through the polarizer 3 is transmitted through the liquid crystal cell 5 to become elliptically polarized light 101'. The light 101' transmitted through the cell 5 is transmitted through the optical delay plates 10 and 11 to become linearly polarized light 102'. The light 102' transmitted through the plates 10 and 11 is either transmitted through or interrupted by the polarizer 4 in accordance with its absorbing axis.

According to extensive studies of the present inventors, it is preferable to use two stacked optical delay plates. If only one optical delay plate is used, light transmitted through the optical delay plate does not become substantially completely linearly polarized light but more or less properties of elliptically polarized light remain. For this reason, a portion supposed to display black color, not perfect black but gray, results in a less poor contrast. If three or more optical delay plates are used, light transmitted through the optical delay plates becomes more completely linearly polarized light to provide a slightly higher contrast. If three or more optical delay plates are used, however, the liquid crystal display device becomes expensive.

Examples of the present invention will be described below.

EXAMPLE 1

Figure 5:
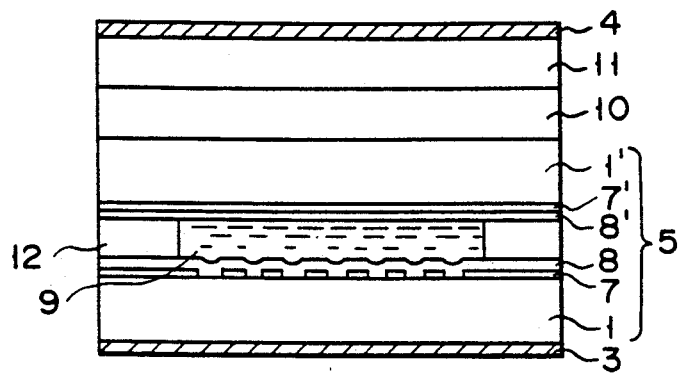
FIG. 5 is a sectional view showing the liquid crystal display device according to the embodiment of the present invention.

FIG. 5 is a sectional view showing a liquid crystal display device of this example. Alignment films 8 and 8' consisting of polyimide and transparent electrodes 7 and 7' are formed on substantially parallel substrates 1 and 1', respectively. A liquid crystal composition 9 is filled between the substrates 1 and 1' and sealed by a sealing agent 12 consisting of an epoxy adhesive, thereby forming a liquid crystal cell 5. The cell thickness (substrate spacing) d of the cell 5 is 6.6 μm. In the cell 5, liquid crystal molecules are arranged in twisted mode through twist angle $\Psi = 240°$ counterclockwise along the direction from the substrate 1' to substrate 1 in accordance with an alignment direction r of the alignment film 8 on the substrate 1 and an alignment direction r' of the alignment film 8' on the substrate 1'. In this case, an angle $Ar_2$ of the direction r' is $-30°$ and an angle $Ar_1$ of the direction r is $+210°$ with respect to the reference line. A tilt angle $\theta$ of the liquid crystal molecule is 1.5°.

The liquid crystal composition of the cell 5 was prepared by adding S-811 (available from E. MERCK Co.) as a counterclockwise chiral agent to ZLI3711 (E. MERCK Co.). Since an optical anisotropy $\Delta n$ of this liquid crystal composition was 0.1045, its retardation $R = \Delta n \cdot d \cdot \cos^2\theta$ was about 0.69 μm.

A first optical delay plate 10 consisting of a stretched polyvinyl alcohol is arranged on the substrate 1' such that its stretching direction (optical axis) forms an angle of $A_1 = 48°$ with respect to the reference line. Similarly, a second optical delay plate 11 consisting of a stretched polyvinyl alcohol is arranged on the first plate 10 such that its stretching direction forms an angle of $A_2 = 5°$ with respect to the reference line. At this time, an angle of rotation from the optical axis of the second plate 1 to that of the first plate 10 was 43° counterclockwise. The retardation value R of the first plate 10 was 0.365 μm, and that of the second plate 11 was 0.365 μm.

A first polarizer 3 is arranged under the substrate so that its absorbing axis forms an angle of $P_1 = 68°$ with respect to the reference line. A second polarizer 4 is arranged on the second plate 11 so that its absorbing axis forms an angle of $P_2 = -40°$ with respect to the reference line.

Figure 6:
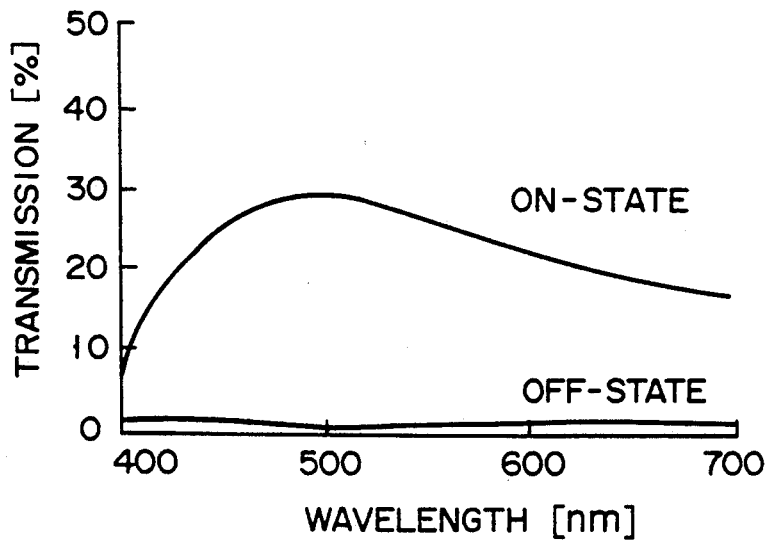
FIG. 6 is a graph showing a transmission change of the liquid crystal display device of the present invention with respect to a wavelength change.

FIG. 6 shows a wavelength dependence of transmission through the liquid crystal cell 5 of this example in an on- or off-state. As is apparent from FIG. 6, the transmission upon either off- or on-state is substantially flat regardless of the wavelength. Therefore, a so-called normally black mode in which black and white are displayed in off- and on-states, respectively, can be executed.

In addition, when this liquid crystal cell was multiplex-driven at a 1/200 duty, the contrast ratio was high, 14:1.

Furthermore, a viewing angle of this liquid crystal display device is large.

EXAMPLE 2

In the liquid crystal display device of Example 1, first and second optical delay plates and first and second polarizers were arranged as follows.

That is, a first optical delay plate 10 was arranged such that its stretching direction was $A_1 = 27°$ with respect to a reference line, and a second optical delay plate 11 was arranged thereon such that its stretching direction was $A_2 = -22°$ with respect to the reference line. At this time, an angle of rotation from an optical axis of the second plate 11 to that of the first plate 10 was 49° counterclockwise. A retardation value R of the first plate 10 was 0.400 μm, and that of the second plate 11 was 0.400 μm.

A polarizer 3 was arranged such that its absorbing axis formed an angle of $P_1 = 47°$ with respect to the reference line, and the polarizer 4 was arranged such that its absorbing axis formed an angle of $P_2 = -64°$ with respect to the reference line.

A contrast obtained when the device was driven in the same manner as in Example 1 was high, about 12:1. In addition, a viewing angle was large.

EXAMPLE 3

In the liquid crystal display device of Example 1, first and second optical delay plates and first and second polarizers were arranged as follows.

In the liquid crystal cell used in Example 1, a first optical delay plate 10 having a retardation value of 0.299 μm was arranged such that its stretching direction satisfied $A_1 = 45°$ with respect to a reference line. A second optical delay plate 11 having a retardation value of 0.394 μm was arranged on the first plate such that its stretching direction satisfied $A_2 = 5°$ with respect to the reference line. At this time, an angle of rotation of an optical axis of the second plate 11 to that of the first plate 10 was 40° counterclockwise.

In addition, a first polarizer 3 was arranged such that its absorbing axis formed an angle of $P_1 = 69°$ with respect to the reference line, and a second polarizer 4 was arranged such that its absorbing axis formed an angle of $P_2 = -23°$ with respect to the reference line.

In this example, a contrast obtained when the device was driven under the same conditions as in Example 1 was high, about 1:1. In addition, a viewing angle was large.

COMPARATIVE EXAMPLE

In Example 1, a first optical delay plate 10 was arranged such that its stretching direction formed an angle of $A_1 = 6°$ with respect to a reference line, and a second optical delay plate 11 was arranged thereon such that its stretching direction formed an angle of $A_2 = 48°$ with respect to the reference line. At this time, an angle of rotation defined between optical axes of the two optical delay plates was 42° clockwise.

Figure 7:
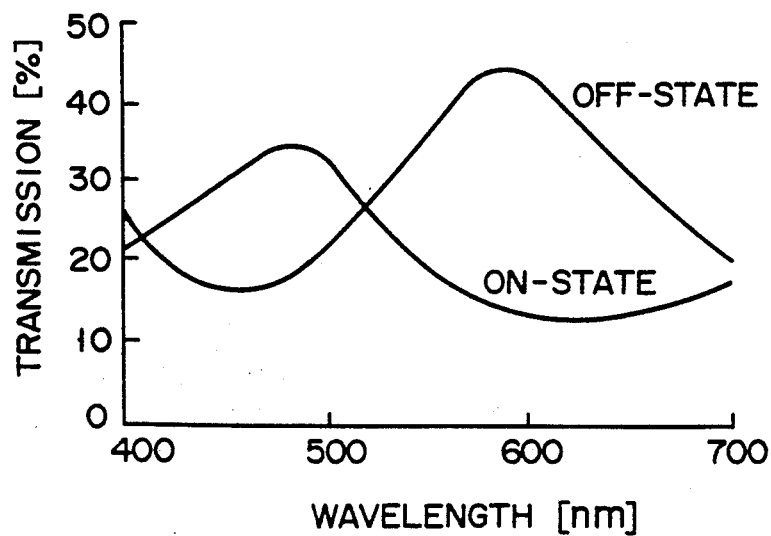
FIG. 7 is a graph showing a transmission change of the liquid crystal display device of a comparative example of the present invention with respect to a wavelength change.

FIG. 7 shows a transmission change with respect to a wavelength change obtained when the device was driven under the same conditions as in Example 1. As is apparent from FIG. 7, a background became chromatic in yellow in an off-state and, in addition, the contrast ratio is small.

What is claimed is:

1. A liquid crystal display device comprising:
   a liquid crystal cell including two substrates which are arranged substantially parallel to each other and have electrodes on opposing surfaces thereof, and a liquid crystal composition held between said substrates;
   first and second polarizers arranged at both sides of said liquid crystal cell;
   a first optical delay plate arranged between said liquid crystal cell and said second polarizer; and
   a second optical delay plate arranged between said first optical delay plate and said second polarizer, wherein liquid crystal molecules in said liquid crystal composition are arranged in a twisted mode between 180° to 360° from a second polarizer side to a first polarizer side, said first and second optical delay plates are arranged such that optical axes thereof cross to form an acute angle, and a twist direction of said liquid crystal molecules in the state of twisted mode is the same as a direction from the optical axis of said second optical delay plate toward said first optical delay plate shifted by the acute angle.

2. A device according to claim 1, wherein each of said first and second optical delay plates comprises a stretched film consisting of polyvinyl alcohol.

3. A device according to claim 1, wherein a retardation value of said liquid crystal cell is about 0.69 μm, and a total of retardation values of said first and second optical delay plates is 0.693 to 0.800 μm.

* * * * *